United States Patent
Viaud et al.

(10) Patent No.: US 7,064,282 B2
(45) Date of Patent: Jun. 20, 2006

(54) LARGE ROUND BALER WITH WEIGHING ARRANGEMENT

(75) Inventors: Jean Viaud, Gray (FR); Stéphane Biziorek, Champlitte (FR)

(73) Assignee: Deere & Company, Moline, IL (US)

( * ) Notice: Subject to any disclaimer, the term of this patent is extended or adjusted under 35 U.S.C. 154(b) by 178 days.

(21) Appl. No.: 10/655,188

(22) Filed: Sep. 4, 2003

(65) Prior Publication Data
US 2004/0089483 A1 May 13, 2004

(30) Foreign Application Priority Data
Sep. 6, 2002 (DE) ............................. 102 41 215

(51) Int. Cl.
G01G 19/08 (2006.01)
B65B 1/32 (2006.01)
A01D 41/127 (2006.01)

(52) U.S. Cl. ..................... 177/136; 53/502; 56/10.2 R
(58) Field of Classification Search ........ 177/136–144; 53/502; 56/10.2 R
See application file for complete search history.

(56) References Cited

U.S. PATENT DOCUMENTS

| | | | | |
|---|---|---|---|---|
| 4,362,097 A | * | 12/1982 | Rogers | 100/99 |
| 5,161,628 A | * | 11/1992 | Wirth | 177/137 |
| 5,959,257 A | * | 9/1999 | Campbell et al. | 177/16 |
| 6,232,565 B1 | * | 5/2001 | Gottlober | 177/136 |
| 6,313,414 B1 | * | 11/2001 | Campbell | 177/16 |
| 6,370,852 B1 | * | 4/2002 | Ohlemeyer et al. | 56/10.2 R |
| 6,378,276 B1 | * | 4/2002 | Dorge et al. | 53/502 |
| 6,457,295 B1 | * | 10/2002 | Arnold | 53/211 |
| 6,525,276 B1 | * | 2/2003 | Vellidus et al. | 177/136 |
| 6,640,699 B1 | * | 11/2003 | Viaud | 100/7 |
| 2004/0089483 A1 | * | 5/2004 | Viaud et al. | |
| 2004/0134177 A1 | * | 7/2004 | Viaud | |

FOREIGN PATENT DOCUMENTS

| | | | |
|---|---|---|---|
| EP | 1 034 695 A | | 10/1999 |
| EP | 1034695 A1 | * | 9/2000 |

* cited by examiner

Primary Examiner—Randy W. Gibson

(57) ABSTRACT

A large round baler is provided with a weighing arrangement for the detection of the weight of a cylindrical bale. The weighing arrangement is arranged to detect the force that a cylindrical bale applies to a support element located in the baling chamber and movable relative to the bale for supporting substantially the entire weight of the bale during discharge of the bale from the baling chamber. So that a true weight reading is obtained, the side pressure exerted on the bale by the side walls is released before the weight measurement takes place. Additionally, an inclination sensor is provided for sending information to an evaluation arrangement which makes an adjustment in a sensed weight to account for any engagement of the bale with the sides of the baling chamber due to side-to-side inclination.

13 Claims, 4 Drawing Sheets

LARGE ROUND BALER WITH WEIGHING ARRANGEMENT

FIELD OF THE INVENTION

The invention concerns a large round baler with a weighing arrangement for the detection of the weight of a compressed cylindrical bale.

BACKGROUND OF THE INVENTION

EP 1 034 695 A describes a large round baler that is equipped with a roll-out arrangement configured as a weighing arrangement for the finished cylindrical bale. The roll-out arrangement is configured as an inclined plane arranged underneath the rear flap that can be flipped upward, over which the bale leaves the large round baler and reaches the ground of the field. The weighing arrangement detects the weight of the bale in that the force applied by it to the roll-out arrangement or the acceleration of the bale during its rolling off the roll-out arrangement is measured by sensors.

In this large round baler, it is seen as a disadvantage that elements essential to the function of the weighing arrangement are arranged unprotected on the outside of the large round baler, so that they are exposed to the environmental effects of the surroundings and can easily be damaged.

SUMMARY OF THE INVENTION

The problem underlying the invention is seen in the need to make available an improved large round baler with a weighing arrangement.

This problem is solved according to the invention by the teaching of patent claim 1, where the further patent claims cite characteristics that further develop the solution to great advantage.

It is proposed that a support element in the baling chamber of the large round baler be equipped with a weighing arrangement. A cylindrical bale produced in the baling chamber rests on the support element, so that the force applied by the bale to the support element can be detected by the weighing element and utilized for the determination of the weight or mass of the cylindrical bale.

In this way, the result is that the weighing arrangement is arranged in the interior of the large round baler protected against environmental effects and unintended damage.

It would fundamentally be conceivable that the large round baler be configured in such a way that the entire weight of the cylindrical bale rests on the support element, so that the weight applied to it corresponds to the weight of the cylindrical bale. However, such an arrangement would be relatively costly, since as a rule, the cylindrical bale is supported by several elements whose support forces must be determined individually or together. Therefore, in a preferred embodiment, the support element can be moved relative to the bale.

In actual fact, the cylindrical bale can move relative to the support element, particularly during the ejection, for example, by rolling, where the weight is detected by the weighing arrangement. On the basis of the course of the force detected by the weighing arrangement, an evaluation arrangement determines the weight of the bale. Alternatively, or in addition, the support element can move relative to the large round baler and thereby the cylindrical bale. During this movement, there is preferably a point in time at which the cylindrical bale rests entirely, or almost entirely, on the support element. The force acting at this point in time corresponds to the weight of the bale.

A support element of this type is appropriately actively driven by a drive, for example, an electric or hydraulic motor. In order to be able to detect the weight of the bale, the movement of the support element is performed preferably about a pivot axis that extends at least approximately through the central axis of a finished cylindrical bale. However, the pivot axis may be located before or behind this central axis, or underneath or above it. Hence, the support element extends along the underside of the cylindrical bale.

During the formation of the cylindrical bale, the support element is located preferably at its underside, ahead of the axis of the cylindrical bale in the direction of operation, in a bale forming position, in order to support the formation of a core of the bale. From this initial position, it can be repositioned in correspondence with the increase in the size of the cylindrical bale being formed. Before the ejection of the cylindrical bale, the support element is moved into a bale ejection position, in which the bale no longer rests on the support element. During the intervening movement, a partial region of the underside of the bale is crossed and its weight is detected. In the ejection position, the support element is located, for example, above the ejection end of the baling chamber of the large round baler. In another embodiment, the support element could be moved forward out of a bale forming position, in which it is located behind the axis of the bale in the direction of operation. Simultaneously, an impulse is delivered to the cylindrical bale that rolls it to the rear out of the baling chamber.

In order to avoid falsifying the result of the measurement by friction forces between the side walls of the baling chamber and the cylindrical bale, it is useful to move the side walls of the baling chamber apart before the ejection of the cylindrical bale and the detection of its weight. This movement is performed preferably by the drive that also moves the support element. But it would also be conceivable to use a separate drive, for example, a hydraulic cylinder, particularly if the support element is stationary. The outward movement of the side walls is also useful for the reduction of the friction forces during the ejection of the bale. After the ejection of the bale, the side walls are again moved towards each other for the formation of a further bale.

In order to attain sufficiently accurate measurement values for the weight of the cylindrical bale, (for example, for the geo-referenced yield mapping) it may be appropriate to operate an evaluation arrangement for the correction of the measured weight in order to consider, for example, a possible inclination of the large round baler from the horizontal, that would lead to the cylindrical bale making contact with the side walls, or baling elements lying upon the cylindrical bale or lying between the cylindrical bale and the support element.

The support element upon which the cylindrical bale rests, is preferably a pulley or a roll, whose axis extends parallel to the axis of the cylindrical bale. In order to avoid friction, it is appropriately free to rotate about its axis. Several pulleys or rolls could also be used.

The weighing arrangement includes preferably a measurement cell, known in itself, that is located in a positive lock between the support element and the frame of the large round baler. But any other means can be used that are appropriate for the detection of the weight of the cylindrical bale.

BRIEF DESCRIPTION OF THE DRAWINGS

The drawings show an embodiment of the invention that shall be described in greater detail in the following.

DESCRIPTION OF THE PREFERRED EMBODIMENT

Figure 1:
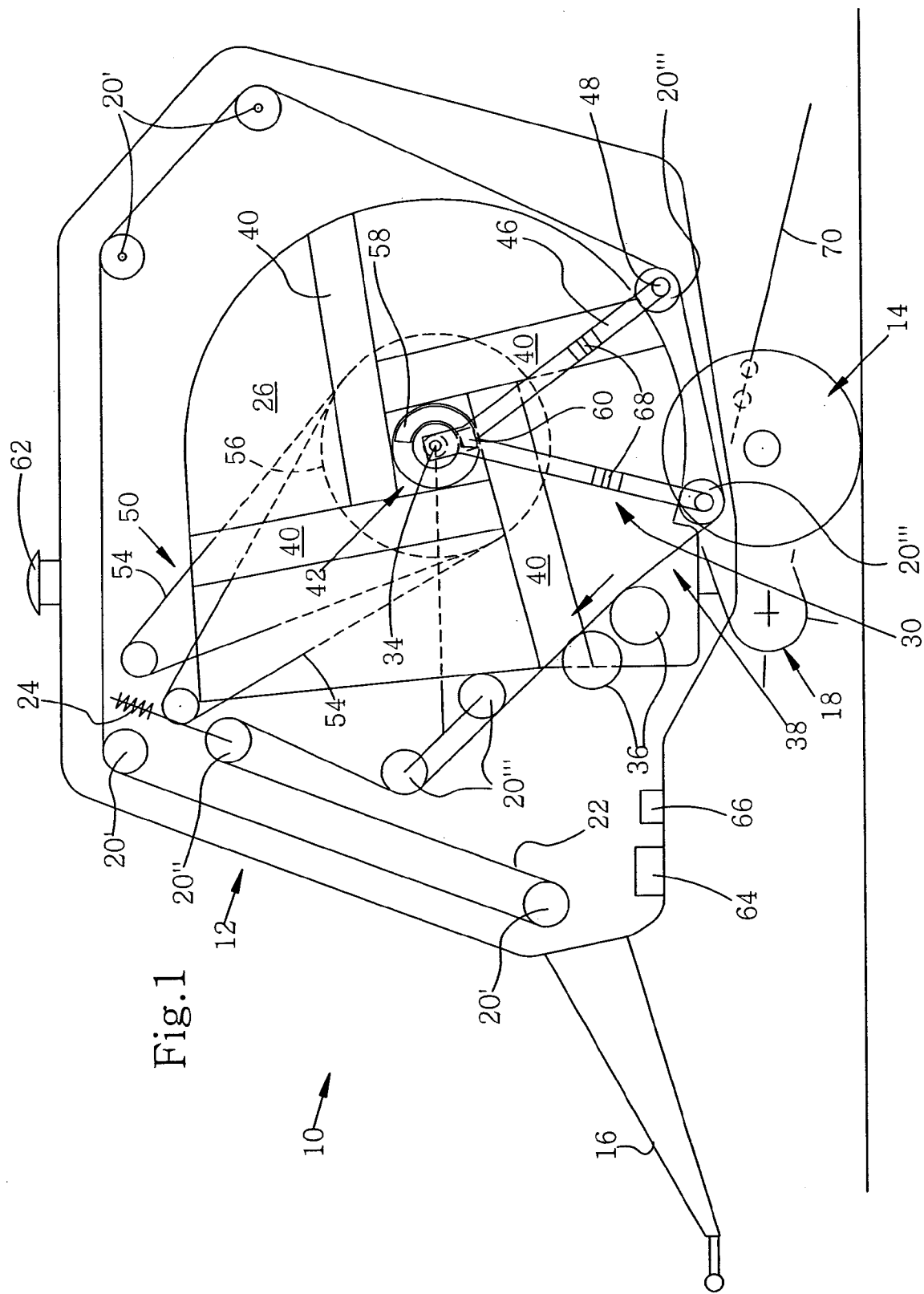
FIG. 1 shows a schematic left side view of a large round baler incorporating the present invention, with the baling chamber shown in a closed position.
Figure 2:
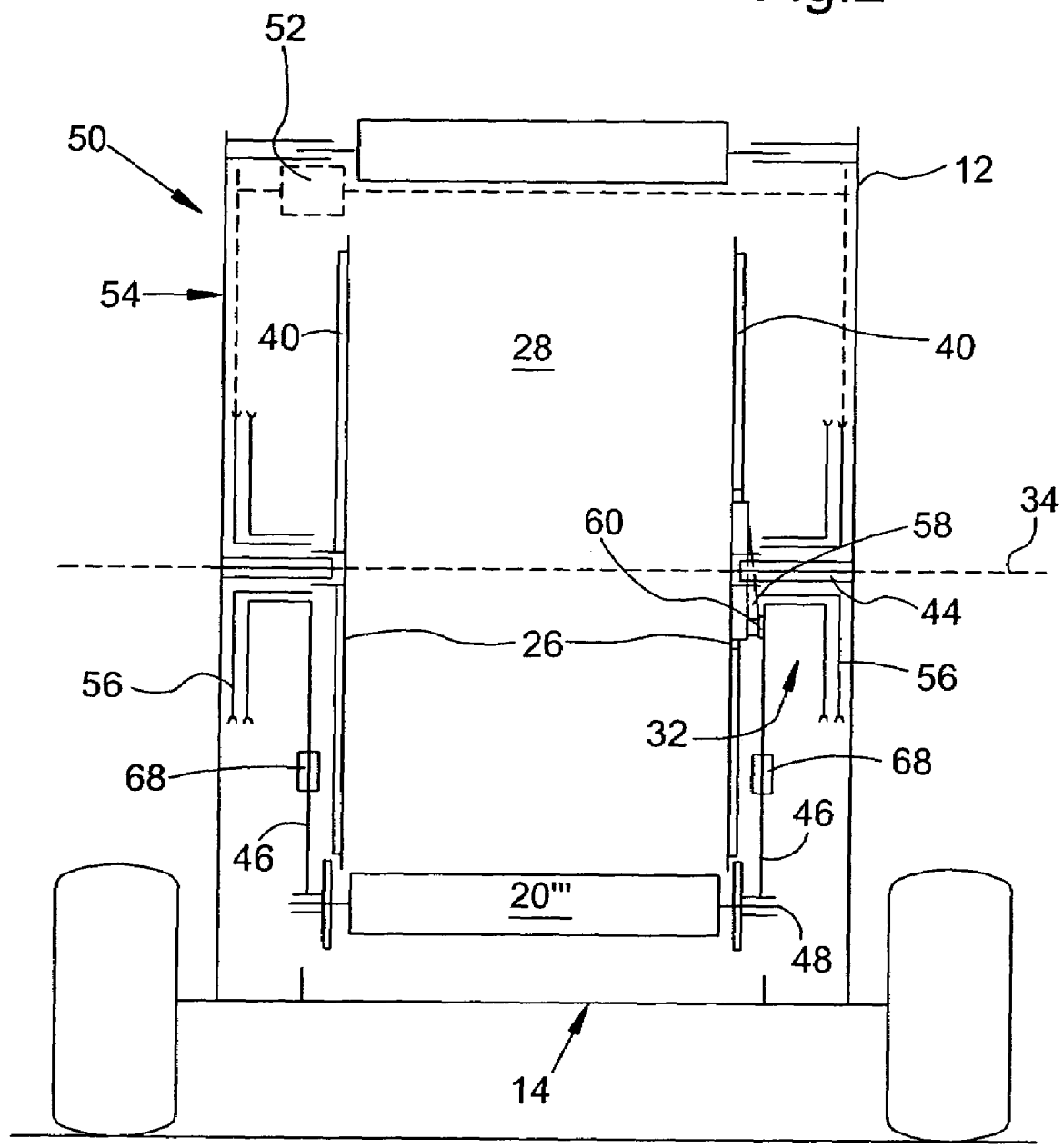
FIG. 2 is a schematic rear view of the large round baler shown in FIG. 1.

Referring now to FIGS. 1 and 2, there is shown a large round baler 10 including a frame 12, a chassis 14, a towbar 16, a take-up arrangement 18, rolls 20'–20''', baling elements 22, a tensioning arrangement 24, side walls 26, a baling chamber 28, pivoting parts 30, and a pressure arrangement 32.

In the embodiment shown, the large round baler 10 is equipped with a baling chamber 28 of variable size, but may also be equipped with a baling chamber 28 whose size cannot be varied. In the baling chamber 28, harvested crop taken up from the ground is formed into a so-called cylindrical bale which presses against the side walls 26 with its end faces.

The frame 12 can be seen particularly well in FIG. 2 and is composed of a welded and/or bolted assembly to which all components of the large round baler 10 are fastened, that is supported on the chassis 14 and that can be connected by means of the towbar 16 to a towing vehicle, not shown. The frame 12 carries, among other items, sheathing components, not shown, several of the pulleys 20'–20''', the side walls 26, and the pivoting parts 30. The frame 12 encloses in a wide area the region surrounded by the side walls 26 and the baling elements 22.

The chassis 14 consists of an axle and wheels, not described in any further detail, on which the frame 12 rests. The towbar 16 engages the forward side of the frame 12 rigidly or adjustable in height.

The take-up arrangement 18 is configured in the usual manner as a so-called pick-up and connected to the frame 12 so as to be adjustable in height. The take-up arrangement 18 can be followed by a cutting arrangement, also known in itself. The take-up arrangement 18 takes up crop deposited on the ground and conducts it over a cutting arrangement that may be available further into the baling chamber 28, in which it is formed into a cylindrical bale.

Several rolls 20' are supported in bearings, free to rotate, on stationary axes in the frame 12. Several rolls 20'' support the baling elements 22. In particular, one of the rolls 20'' is mounted for movement against the force of a spring 24, so that the baling elements 22 can deflect to accommodate the growing diameter of the bale. Still other rolls 20''' can be pivoted on pivoting parts 30 about a pivot axis 34. All rolls 20'–20''' extend parallel to each other and are configured sufficiently wide and arranged in such a way that the baling elements 22 can run over them and enclose the baling chamber 28. Beside the rolls 20'–20''', rolls 36 are provided that are located above an inlet opening 38 in the baling chamber 28. These rolls 36 operate as so-called starter rolls during the beginning of the bale forming process and on which a part of the weight of the cylindrical bale can be supported.

The baling elements 22 disclosed here are in the form of a plurality of relatively narrow belts, extending parallel to each other, that generally cover the baling chamber 28 across its width. In place of the relatively narrow belts, the baling elements 22 could be configured as bar-chain conveyors or as a single wide belt, as is also known practice. The baling elements 22 are endless and are brought into a circulating movement by a frictional engagement with at least one pulley 20' that can be driven. In the region of the inlet opening 38, the baling elements 22 form a bridge that forms itself into a loop that deflects inward with increasing amounts of harvested crop and that surrounds the forming cylindrical bale. The baling elements 22 are kept under tension by being conducted over the spring-loaded, movable roll 20''.

The tensioning arrangement 24 is configured in a known manner wherein the roll 20'' is guided on an arm, slide or the like against the force of a spring 24 and constantly maintains a loop of the baling elements 22 under tension.

As viewed in FIG. 1, the side walls 26 take the shape of a "D", where the rear end region, at the right in FIG. 1, takes the shape of a semi-circle or bow that generally follows the line of the circumference of the finished bale, that is, it follows the line of a circular arc. Basically, the side walls 26 are configured as one-piece components, that is, they are not divided along an approximately central vertical plane, as in conventional large round balers. They may, however, be composed throughout of several parts. FIG. 2 reveals that the side walls 26 maintain a not inconsiderable spacing to the frame 12, and thereby can be deflected to the outside, as described below. The side walls 26 are configured so as to be stiff in bending by means of reinforcing struts 40, where the reinforcing struts 40 can be bolted or welded on. According to FIG. 1, the reinforcing struts 40 extend in an approximate star-shape with respect to the pivot axis 34 and extend tangentially with small spacing to it, whereby the angularly adjacent struts 40 form a right angle with each other. On the basis of this, they enclose a four-sided chamber 42 in this embodiment. In their forward end region, the side walls 26 are connected, generally rigidly, to the frame 12. Nevertheless, a slight pivoting movement is possible, starting from a position according to FIG. 2 through a few degrees to the outside, due to the fact that the side walls 26 are either configured of a flexible sheet metal in their connecting region or are connected in a flexible connection, for example, on a flexible flange or are secured on spring-loaded screws. The connection of the side walls 26 to the frame 12 is performed generally along a more or less vertical line at the forward end of the baling chamber 28. In the region of the pivot axis 34, each side wall 26 is guided on an axle 44 which is rigidly fastened to the frame 12 and is simultaneously used as pivot axis for the pivoting parts 30.

In contrast to the embodiment shown, the connection of the side wall 26 or the side walls 26 can also be performed along an upper line that is more or less horizontal or lightly inclined, with the result that the side walls 26 diverge in the downward direction when the cylindrical bale is ejected.

The baling chamber 28 is variable in its size and is bordered at the beginning, that is, when the baling chamber 28 is empty, by an approximately triangular cylindrical space between the take-up arrangement 18 and the baling elements 22 and at its sides by the side walls 26. With increasing amounts of harvested crop supplied, the baling chamber 28 enlarges and finally assumes a cross section that follows the shape of the side walls 26 in the rear region.

Figure 3:
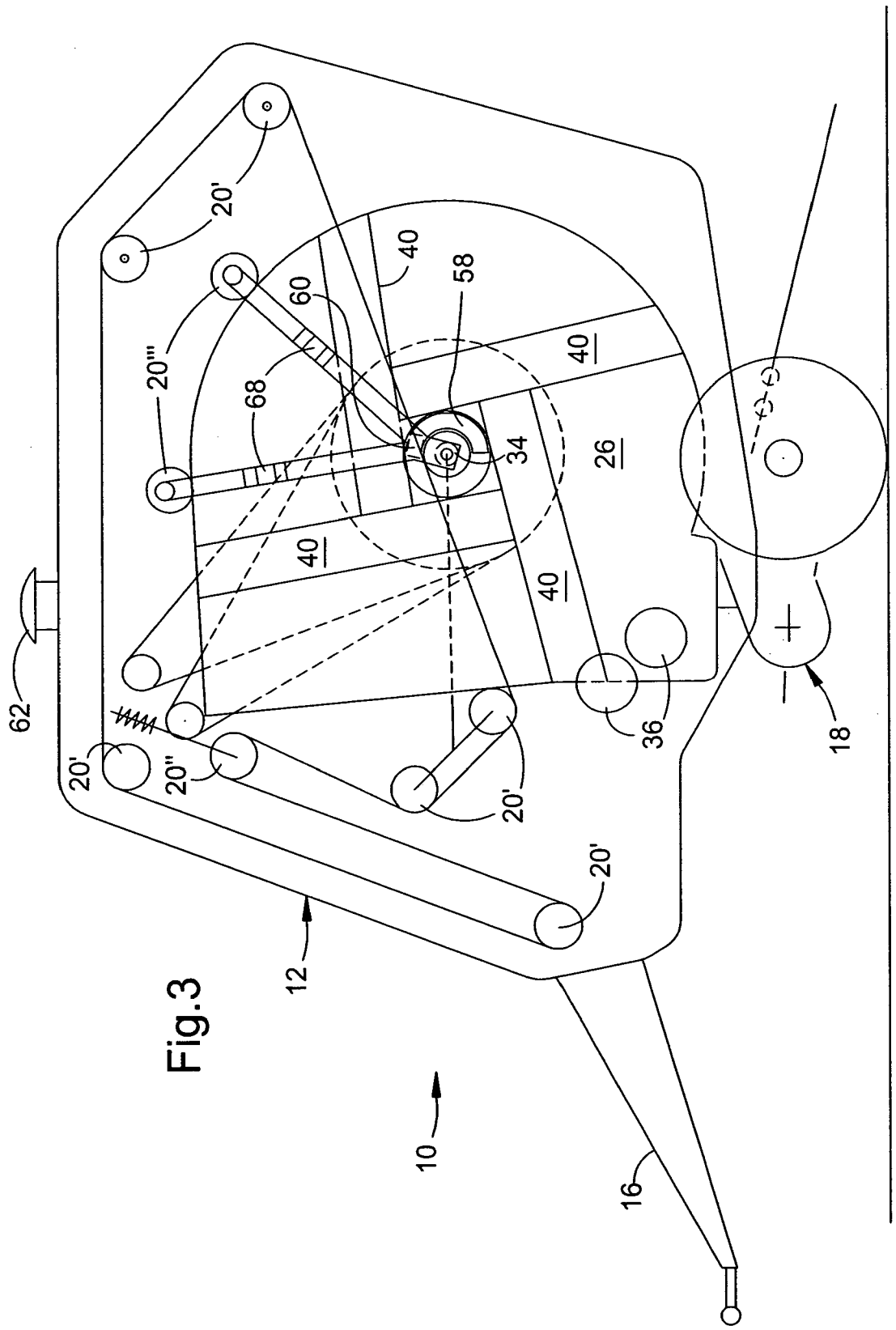
FIG. 3 is a view like that of FIG. 1, but showing the baling chamber in an open position.

In this embodiment, the pivoting parts 30 are equipped on each side with one or more arms 46 extending radially from the pivot axis 34, and one or more transverse members 48 attached to its or their outer ends extending transverse to these. At the end of each transverse member 48 one of the rolls 20''' is provided. The pivoting parts 30 are arranged with the radially inner end of each arm 46, free to pivot, on the axis 34. The position of the arms 46 is controlled by means of a drive 50 that includes a motor 52 and a flexible drive element 54. Any other type of drive appropriate for rotating the pivoting part 30 may be provided. The pivoting parts 30 could also be driven synchronously by common pivoting drives or could be rigidly connected to each other, so that only a single pivoting drive is required. The motor 52 can be braked in each of its positions and retains the arms 46 correspondingly stationary. The output drive pulleys or sprockets 56 associated with each of the flexible drive elements 54 are supported in bearings concentric to each other and to the axis 34, and are connected, fixed against rotation, in each case with one pivoting part 30. The pivoting parts 30 are controlled in such a way that the forward pivoting part 30 is repositioned during the bale forming phase, in order to assist during the formation of the core of a bale, and that the forward pivoting part 30 assumes a lower position while the cylindrical bale is being formed, and both pivoting parts 30 assume an upper position when the cylindrical bale is ejected. The two end positions of the pivoting parts 30 are shown in FIGS. 1 and 3.

The large round baler described so far is essentially in all its details the same as that described in U.S. patent application Ser. No. 10/163,156, filed 04 Jun. 2002, whose contents is hereby incorporated into the present application.

The pressure arrangement 32 contains a cam member 58 defining an inclined path increasing in height in a direction away from the baling chamber side 26, and a follower 60 (see the partial section to FIG. 2 with a side view for this), and is used for and during the ejection of the cylindrical bale in order to reduce the pressure and thereby the friction of the side walls 26 on its end faces, so that the cylindrical bale can be unloaded more easily from the baling chamber 28.

The cam member 58 is located on a circular arc extending concentric to the pivot axis 34 and is fastened to the outside of both side walls 26 (only the cam member 58 on the right side wall 26 is shown), where it would also be sufficient to provide only one cam member 58 only on one side wall 26. In the present embodiment, the cam member 58 is formed by a bent steel part that is bolted to the side walls 26 and that is uniformly inclined from the wall 26 within the chamber 42.

The follower member 60 is provided on the side of the arm 46 of the rear pivoting part 30 that faces the longitudinal center plane of the large round baler 10, and is configured as a sliding surface. In order to minimize the friction, the sliding surfaces are lubricated. Alternatively, the follower member 60 could also be configured as a wheel, pulley, ball or similar rotating member. The follower member 60 is arranged in such a way that it describes a circular path about the pivot axis 34 upon a rotation of the pivoting part 30 and moves along the inclined plane defined by the cam member 58. Preferably, the follower member 60 is in contact at all times with the cam member 58.

Relative to the side wall 26, the follower member 60 lies upon the highest elevation of the cam member 58 when the pivoting parts 30 are located in their lower end position, shown in FIG. 1, wherein the cylindrical bale can be produced. When the pivoting parts 30 are brought into their upper position, shown in FIG. 3, in which the cylindrical bale can be released from the baling chamber 28, the follower member 60 is moved towards the lowest point of the inclined plane defined by the cam 58. The difference between the highest and the lowest point may amount, for example, to approximately 20 to 50 mm.

As soon as a cylindrical bale has been formed in the baling chamber 28, the pivoting part 30 is raised whereupon the side walls 26 move outward on the basis of the pressure existing in the baling chamber 28 that originates from the compressed harvested crop. As a result, the friction between the inner side of the side walls 26 and the end faces of the cylindrical bale is reduced and the latter falls out of the baling chamber 28 on the basis of the force of gravity, that is, it rolls over the bottom of the baling chamber 28 and a roll-out arrangement 70, extending rearward from the chamber, onto the ground of the field. As soon as the cylindrical bale has left the baling chamber 28 and the large round baler 10 has been moved forward an amount sufficient for the pivoting part 30 to again be lowered, the pivoting part 30 is lowered so that the follower member 60 is moved along the cam member 58 to the highest point of the inclined plane and thereby presses the side walls 26 inward.

For yield mapping, the large round baler 10 is equipped with a position sensor 62 in the form of a GPS satellite antenna. This is connected with an evaluation arrangement 64 that in turn, is connected with a weighing arrangement that includes an inclination sensor 66 and four measurement cells 68. The measurement cells 68 are inserted into the arms 46 (that are interrupted at the attaching point) and detect the force that the cylindrical bale applies to the rolls 20''' that are used as bale support elements. Measurement cells known in themselves, strain gauges or any other desired force sensors could be used. In place of the two arms 46 shown in the drawing, the rolls 20''' could also be connected by a lengthwise transverse member that is connected to an arm leading upward to the pivot axis 34 into each of which a measurement cell 68 is inserted. In such an embodiment, only two measurement cells 68 are required.

A bus line, (for example, a CAN bus), connects the position sensor 62 with the inclination sensor 66, the measurement cells 68, and the position sensor 62. The evaluation arrangement 64 and the position sensor 62 could also be located on the towing vehicle, where corresponding software considers the offset in space between the position sensor 62 and the take-up arrangement 18. During operation, the evaluation arrangement 64 produces a yield map in which the weight or mass of the cylindrical bales produced is recorded in geo-referenced terms.

While the harvested crop is being taken up from the field, a cylindrical bale is being formed little by little in the baling chamber 28. Once it has reached the desired size that is detected by a sensor, the motor 52 of the drive 50 is activated by a control arrangement, as described above. Thereby, the pivoting parts 30 rotate counterclockwise, as viewed in FIG. 1, and the side walls 46 move outward. Initially, the cylindrical bale rests upon the pulleys 20''' (with the sections of the baling elements 22 lying between them), while the contact force of the cylindrical bale on the remaining rolls 20' or rolls 36 remains sufficiently low. The baling elements 22 are relieved of their tension, particularly by the pivoting movement of the pivoting parts 30 to the rear, and do not affect the measured values of the measurement cells 68. Any friction of the cylindrical bale on the side walls 26 is eliminated as long as the large round baler 10 is sufficiently horizontal, since the side walls 26 have been repositioned to the outside. The forward roll 20′″, shown at the left in FIG. 1, rolls along the underside of the cylindrical bale and then along its rear side, until it comes to a stop at its upper side, as is shown in FIG. 3. The cylindrical bale is then free to roll down the ramp 70 to the ground.

Figure 4:
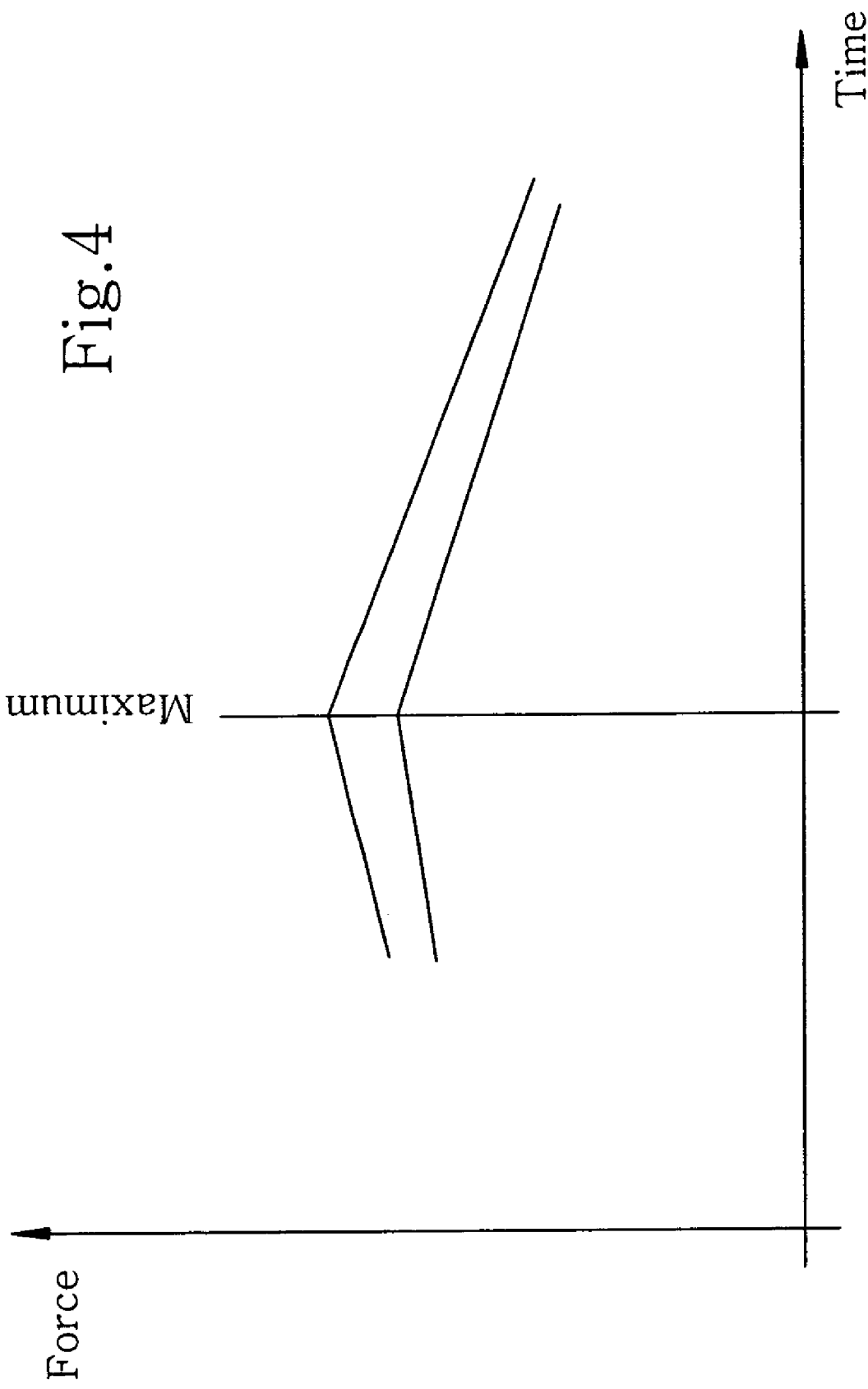
FIG. 4 shows a graph of the measured support forces over a period of time.

During this process, the evaluation arrangement 64 detects the measurement values of the measurement cells 68. An example of the measurement values of two measurement cells 68 on the left and the right side of the cylindrical bale as a function of time is shown in FIG. 4. With increasing time and pivot angle of the pivoting parts 30, the measured values increase to a maximum and then decrease again. When the maximum is reached, the weight of the cylindrical bale rests only on the rolls 20′″, principally on the roll 20′″ that is forward in the direction of operation, while the rolls 36 are almost not loaded at all by the cylindrical bale. Thereby, the maximum measured value gives information about the weight of the cylindrical bale. On the basis of the measured values, particularly the height and/or the position of the maximum, the evaluation arrangement 64 determines the weight of the cylindrical bale.

The measured values of both sides shown in FIG. 4 differ only slightly, which may be caused by the fact that the large round baler 10 is inclined to the left or to the right in the direction of operation, so that the cylindrical bale is in contact with a side wall 26 even though this has been moved outward. An inclination in the direction of operation does not falsify the measured value of the weighing arrangement, since the rolls 20′″ can roll along the underside of the cylindrical bale and are located underneath the cylindrical bale, regardless of the inclination of the baler 10 upon reaching the maximum of the curve of the measured values (see FIG. 4). The evaluation arrangement 64 considers the mean value of the two measured values during the calculation of the weight and taking into account the sideways inclination of the baler 10, detected by means of the inclination sensor 66, in order to easily equalize the influences affecting the measured result. In addition, the weight of the loop of the baling elements 22 located between the pulleys 20′″ and the cylindrical bale can be subtracted from the measured value. Another solution is to calibrate the weighing arrangement of the baler 10 with cylindrical bales of various sizes, in order to obtain the most exact measured values.

Having described the preferred embodiment, it will become apparent that various modifications can be made without departing from the scope of the invention as defined in the accompanying claims.

The invention claimed is:

1. In a large round baler equipped with a weighing arrangement to detect the weight of a compressed cylindrical bale, the baler including a main frame supporting side walls defining opposite sides of a baling chamber and a bale-forming arrangement defining a remainder of said baling chamber, an improved weighing arrangement comprising: said baler including at least one bale support element extending transversely across the baling chamber in a location so as to provide support for a bale within said baling chamber; and a load sensing device located between said support element and said main frame for detecting the force that a cylindrical bale applies to said support element.

2. The large round baler, as defined in claim 1, wherein said at least one support element is mounted for movement relative to the cylindrical bale before and/or during the ejection of a cylindrical bale.

3. The large round baler, as defined in claim 2, wherein a drive is coupled to said at least one support element for effecting selective movement of said support element.

4. The large round baler, as defined in claim 2, wherein said at least one support element is so located in said baling chamber and is so moved that a formed bale rests, at one point of time, at least approximately exclusively on said at least one support element during a movement of the support element.

5. The large round baler, as defined in claim 3, wherein said at least one support element is mounted for pivoting about a horizontal, transverse pivot axis which extends in the vicinity of a central axis of a finished cylindrical bale.

6. The large round baler, as defined in claim 3, wherein said at least one support element is mounted for movement between a bale-forming position, which it occupies during bale formation and in which it is located underneath the cylindrical bale being formed, and a bale ejection position in which the formed cylindrical bale no longer rests on said at least one support element.

7. The large round baler, as defined in claim 6, wherein said bale ejection position of said support element is located so as to be above a rear part of a bale formed in said baling chamber.

8. The large round baler, as defined in claim 1, wherein said baling chamber includes side walls mounted for being selectively moved outwardly from a bale-forming position; and a wall control arrangement being associated with said walls for automatically moving them apart before the detection of the weight of the cylindrical bale and for subsequently moving them back to said bale-forming position.

9. The large round baler, as defined in claim 3, wherein said baling chamber includes side walls mounted for being selectively moved outwardly from a bale-forming position; and a wall control arrangement being associated with said walls for automatically moving them apart before the detection of the weight of the cylindrical bale and for subsequently moving them back to said bale-forming position; and said wall control arrangement including said drive for said at least one support element.

10. The large round baler, as defined in claim 2, wherein an evaluation arrangement is coupled for receiving information from said load sensing device that can be operated in order to determine the weight of the cylindrical bale on the basis of sensed weight values sent to the evaluation arrangement during the relative movement between the cylindrical bale and the support element during ejection of a completed bale.

11. The large round baler, as defined in claim 2, wherein an evaluation arrangement is coupled for receiving information from said load sensing device; an inclination sensor coupled for sending information to said evaluation arrangement relative to side-to-side inclination of said baler; and said evaluation arrangement being operated to perform corrections of the weight of the cylindrical bale measured, on the basis of signals received from said inclination sensor.

12. The large round baler, as defined in claim 1, wherein said at least one support element includes a roll supported in bearings, free to rotate, whose axis extends parallel to an axis of a cylindrical bale being formed.

13. The large round baler, as defined in claim 1, wherein said at least one support element extends between, and is coupled to, a pair of parallel arms, in turn, coupled to said main frame; and said weighing arrangement including a measurement cell located in each of said parallel arms.

* * * * *